(12) United States Patent
Kashyap

(10) Patent No.: US 6,968,430 B1
(45) Date of Patent: Nov. 22, 2005

(54) CIRCUIT AND METHOD FOR IMPROVING INSTRUCTION FETCH TIME FROM A CACHE MEMORY DEVICE

(75) Inventor: Asheesh Kashyap, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 389 days.

(21) Appl. No.: 10/277,341

(22) Filed: Oct. 22, 2002

(51) Int. Cl.⁷ .............................................. G06F 12/04
(52) U.S. Cl. ..................... 711/137; 711/125; 712/207; 712/210
(58) Field of Search ................. 711/123, 125, 137; 712/205, 207, 210, 213

(56) References Cited

U.S. PATENT DOCUMENTS

| | | |
|---|---|---|
| 5,860,017 A | 1/1999 | Sharangpani et al. |
| 6,275,927 B2 * | 8/2001 | Roberts ........................ 712/213 |
| 6,460,116 B1 * | 10/2002 | Mahalingaiah ............... 711/125 |
| 6,792,524 B1 | 9/2004 | Peterson et al. |

* cited by examiner

Primary Examiner—Pierre M. Vital
(74) Attorney, Agent, or Firm—Daffer McDaniel, LLP

(57) ABSTRACT

A circuit and method are contemplated herein for improving instruction fetch time by determining mapping information prior to storage of the mapping information in a lower-level memory device. In one embodiment, the circuit and method are adapted to format and align the prefetched instructions into predecoded instructions, and determine mapping information relating the prefetched instructions to the predecoded instructions. In addition, the circuit and method may be adapted to store the mapping information along with corresponding predecoded instructions. By determining the mapping information prior to storage of the mapping information within the lower-level memory device, the circuit and method advantageously increases the rate at which the predecoded instructions may be fetched from the lower-level memory device.

19 Claims, 7 Drawing Sheets

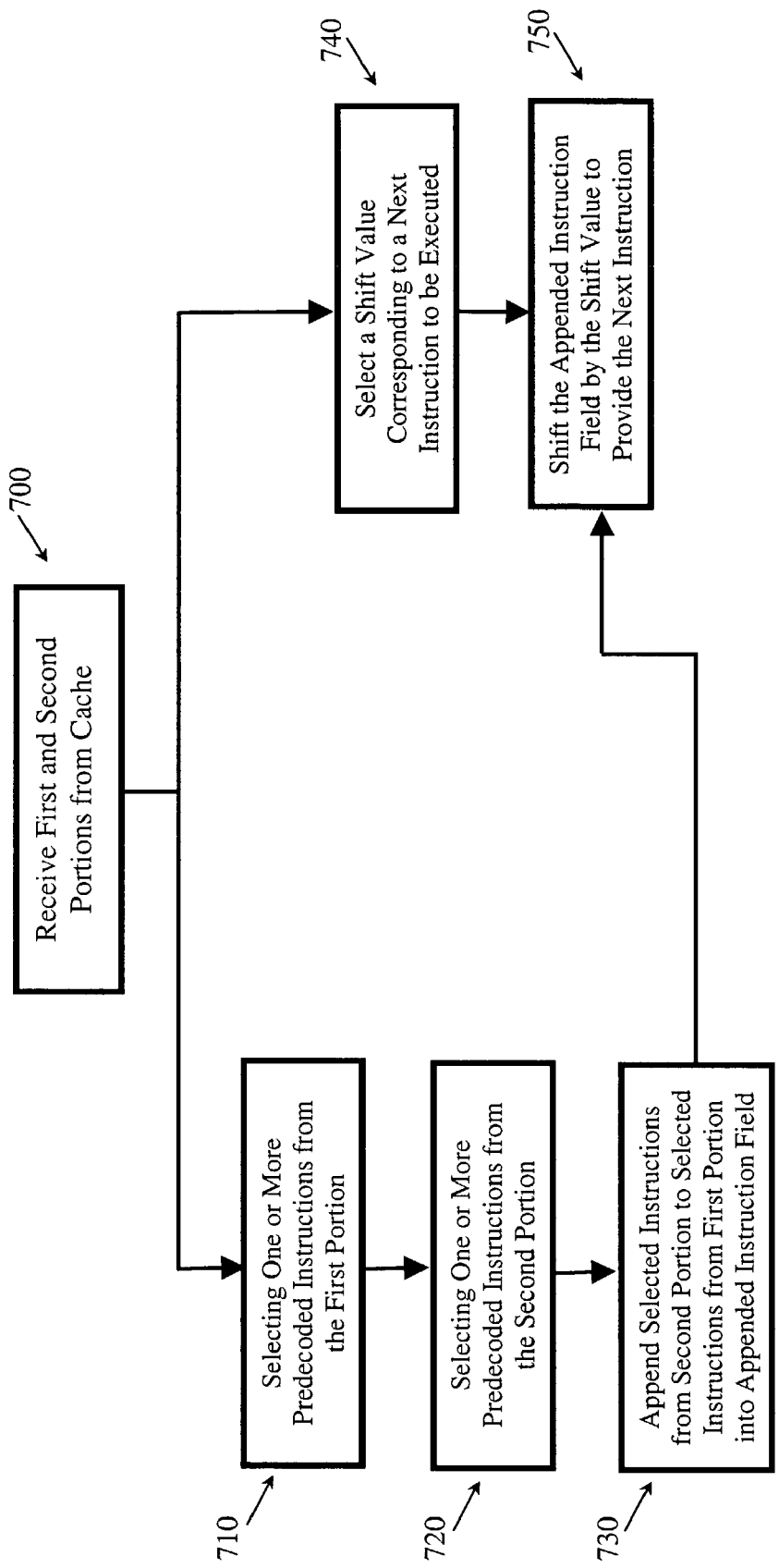

CIRCUIT AND METHOD FOR IMPROVING INSTRUCTION FETCH TIME FROM A CACHE MEMORY DEVICE

BACKGROUND OF THE INVENTION

1. Field of the Invention

This invention relates to microprocessor design, and more particularly to circuits and methods for improving instruction fetch time by determining mapping information relating one or more instructions prefetched from a higher-level memory device to corresponding predecoded instructions stored in a lower-level memory device.

2. Description of the Related Art

The following descriptions and examples are not admitted to be prior art by virtue of their inclusion within this section.

Over the years, the use of microprocessors has become increasingly widespread in a variety of applications. Today, microprocessors may be found not only in computers, but also in a vast array of other products such as VCR's, microwave ovens, and automobiles. In some applications, such as microwave ovens, low cost may be the driving factor in the implementation of the microprocessor. On the other hand, other applications may demand the highest performance obtainable. For example, modern telecommunication systems may require very high speed processing of multiple signals representing voice, video, data, etc. Processing of these signals, which have been densely combined to maximize the use of available communication channels, may be rather complex and time consuming. With an increase in consumer demand for wireless communication devices, such real time signal processing requires not only high performance but also demands low cost. To meet the demands of emerging technologies, designers must constantly strive to increase microprocessor performance while maximizing efficiency and minimizing cost.

With respect to performance, greater overall microprocessor's speed may be achieved by improving the speed of devices within the microprocessor's circuits as well as architectural development that allow for optimal microprocessor's performance and operations. As stated above, microprocessor's speed may be extremely important in a variety of applications. As such, designers have evolved a number of speed enhancing techniques and architectural features. Among these techniques and features may be the instruction pipeline, the use of cache memory, and the concept of prefetching.

A pipeline consists of a sequence of stages through which instructions pass as they are executed. In a typical microprocessor, each instruction comprises an operator and one or more operands. Thus, execution of an instruction is actually a process requiring a plurality of steps. In a pipelined microprocessor, partial processing of an instruction may be performed at each stage of the pipeline. Likewise, partial processing may be performed concurrently on multiple instructions in all stages of the pipeline. In this manner, instructions advance through the pipeline in assembly line fashion to emerge from the pipeline at a rate of one instruction every clock cycle.

The advantage of the pipeline generally lies in performing each of the steps required to execute multiple instructions in a simultaneous manner. To operate efficiently, however, a pipeline must remain full. If the flow of instructions in the pipeline is disrupted, clock cycles may be wasted while the instructions within the pipeline may be prevented from proceeding to the next processing step. Prior to execution, the instructions typically stored in a memory device are fetched into the pipeline by the microprocessor. However, access times for such memory devices are generally much slower than the operating speed of the microprocessor. As such, instruction flow through the pipeline may be impeded by the length of time required to fetch instructions from memory (i.e. memory latency).

An obvious approach to the above problem may be to simply use faster memory devices. Unfortunately, although faster memory devices may be available, they are typically more costly and may consume more power than conventional memory. For many applications, the use of high-speed memory devices throughout the entire memory hierarchy is infeasible. Thus, a more practical alternative for high performance microprocessors may be the use of cache memory.

Cache memory is a secondary memory resource that may be used in addition to the main memory, and generally consists of a limited amount of very high-speed memory devices. Since cache memory is typically small relative to the main memory, cost and power consumption of the cache may not be significant factors in some applications. However, factors such as cost and circuit dimension limitations may place constraints on cache size in other applications.

Cache memory may improve microprocessor's performance whenever the majority of instructions required by the microprocessor are concentrated in a particular region of memory. The principle underlying the use of cache is, more often than not, that the microprocessor typically fetches instructions from the same area of memory. Such a principle is due to the sequential nature in which instructions are stored in memory. In other words, most of the instructions may be executed by the microprocessor in the sequence in which they are encountered in memory.

Assuming the majority of instructions required by the microprocessor are found in a given area of memory, the entire area may be copied (e.g., in a block transfer) to the cache. In this manner, the microprocessor may fetch the instructions as needed from the cache rather than from the main memory. Since cache memory is generally faster than main memory, the pipeline may be able to operate at full speed. Thus, the use of cache memory provides a dramatic improvement in average pipeline throughput. Such an improvement is achieved by providing the pipeline with faster access to instructions than would be possible by directly accessing the instruction from conventional memory. As long as the instructions are reasonably localized, the use of a cache significantly improves microprocessor performance.

To further improve access time to instructions, one or more levels of cache memory may also be included within the system. The number of cache memory devices may vary in a given memory hierarchy. Typically, the lowest level of cache (i.e. the first to be accessed) may be smaller and faster than the one or more levels above the lowest level in the memory hierarchy. When an instruction is called for execution, the memory address associated with the instruction is typically stored in the lowest level of cache for the fastest possible retrieval. The fastest possible operation may be called a "cache hit." A cache hit may occur when the memory address corresponding to the instruction called for execution is stored in the level of cache indicated by the instruction address. If a cache hit occurs, the addressed information may be retrieved from the cache without having to access a higher (and often slower) level of memory in the memory hierarchy.

Conversely, a "cache miss" may occur when an instruction required by the microprocessor is not present in the level of cache indicated by the instruction address. In response to a cache miss, the next higher ordered memory structure may be presented with the instruction address. The next higher ordered memory structure may be another cache, such that another hit or miss may occur. If misses occur at each level of cache, the microprocessor may stall all further instruction executions. During the stall period, the microprocessor may discard the contents of the cache. Subsequently, the necessary information may be fetched as quickly as possible from main memory and placed into cache. Obviously, such a process may be a source of overhead, and if it becomes necessary to empty and refill the cache frequently, system performance may begin to approach that of a microprocessor without cache.

Another advancement in microprocessor's technology relates to the concept of prefetching information, where such information may either be data or instructions. FIG. 1, for example, illustrates one embodiment of the prefetch concept. As illustrated in FIG. 1, prefetch unit 106 may request a block of information by transmitting one or more instruction addresses 110, via memory bus 108, to memory controller 116 of memory device 114. In some cases, memory device 114 may be an external memory device having a relatively high order in the memory hierarchy. Memory controller 116 may retrieve the block of information from memory space 118 and may transmit retrieved instructions 112, via memory bus 108, to processing unit 102. A processing unit, as described herein, is typically a microprocessor, but may alternatively encompass any circuitry adapted to execute instructions. Subsequently, instructions 112 may be written to a storage device lower in the memory hierarchy, such as a lower order level of cache memory device 104. Prefetching may allow the time spent retrieving the block of information to occur concurrently with other actions of processing unit 102. In this manner, when the processing unit 102 requests the prefetched information, there may be little or no delay in having to fetch the information from a nearby cache.

As such, prefetching involves a speculative retrieval of information, where the information may be retrieved from a higher-level memory system, such as external memory device 114, and placed into a lower level memory system, such as cache memory device 104. Such a retrieval may be executed under the expectation that the retrieved information may be needed by the processing unit for an anticipated event at some point after the next successive clock cycle.

In some cases, processing unit 102 may include an internal, or on-chip, cache memory device 104, as illustrated in FIG. 1. An internal cache, often called a primary cache, may be built into the circuitry of the processing unit. Processing unit 102 may further include internal prefetch unit 106, such that the prefetch unit may be coupled to the internal cache memory device via an internal bus. In other cases, however, cache memory device 104 and prefetch unit 106 may be external devices coupled to processing unit 102 via an external bus (not shown). The advantages and disadvantages of including internal versus external devices are well known in the art; thus, only internal devices are illustrated in FIG. 1 for the purpose of simplicity.

Several types of prefetching are known in the art. The most common example of a prefetch may be performed in response to a load operation. A load may occur when the processing unit requests specific information to be retrieved, such that the processing unit may use the retrieved information. In another example, a store operation may prefetch a block of data, such that a portion of the block may be overwritten with current information. Another form of prefetching may occur for certain instructions, such as those involved with certain block or string-related operations. In particular, such instructions may involve strings having numerous words, such as a double word, or some other quantity. For example, the instruction may include a string having a double word, yet the microprocessor is capable of handling only one word (or another quantity) at a time. In such a case, the processing unit may fetch the first word of the string, while concurrently prefetching some or all of the remaining words of the string. Therefore, a prefetch may be performed so that the remaining words in the instruction are more readily accessible for processing after fetching the first word. Thus, prefetching instructions during a time in which the processing unit is occupied with other processing may increase the speed of the processing unit by ensuring the availability of subsequent instructions before the processing unit requests the instructions.

Though prefetching, according to the manners described above, provides the benefit of improved microprocessor performance, the present inventor has recognized various drawbacks resulting from such techniques. Therefore, discussion of such drawbacks is presented below along with various embodiments that reduce the effects of such drawbacks and improve upon the prior art.

SUMMARY OF THE INVENTION

Instruction prefetching may improve a processing unit performance by allowing blocks of information to be prefetched from a higher level of memory and stored in a lower level of memory, which may contain a more accessible, faster memory device (e.g., a cache memory device). As such, many computer systems may include various levels of a memory hierarchy, in which the lower level memory devices are often smaller and faster than the one or more previous levels. When the processing unit requests an instruction at a specific memory address, a block of instructions including the requested instruction may be fetched from a higher ordered memory device, such as a main memory device, a disk drive, etc. In most cases, the instructions in the block are taken from consecutive memory addresses and stored in a lower ordered memory device, such as a cache memory device. Such systems may advantageously reduce the number of main memory accesses, thereby improving the execution time and power consumption of the processing unit.

Coupled to the concept of prefetching is the concept of decoding. Decoding, as described herein, configures the prefetched instructions retrieved from main memory into a format that is recognizable and adaptable to the processing unit receiving the instructions. For example, a system that supports variable length instructions may not be adaptable to a processing unit that can only execute instructions having a fixed length. Therefore, it may be beneficial to configure the variable length instructions according to the format required by the processing unit. As such, decoding may be an important factor in determining the instruction fetch time, and consequently, the execution time of an instruction within the processing unit.

In a high-speed processor, however, it may be necessary to predecode the prefetched instructions to ensure full decoding is completed within a clock cycle. Predecoding, as described herein, is the process of partially decoding prefetched instructions prior to storing the instructions in a lower level memory device. As will be described in more detail below, predecoding advantageously results in further improvements of the processing unit's performance such as improving the instruction fetch time of predecoded instruction. Thus, a circuit and method are contemplated herein for predecoding one or more instructions prefetched from a memory device, determining mapping information for the one or more predecoded instructions, and storing the predecoded instructions with corresponding mapping information within a cache memory device in readiness for subsequent processing of the predecoded instructions.

In one embodiment, a circuit is contemplated herein for receiving one or more variable length instructions from a memory device via a prefetch unit. In some cases, the circuit may include a predecoding unit coupled determine a starting position of the one or more variable length instructions. As such, the predecoding unit may include a starting position detector, which is coupled to determine the starting position for each of the one or more variable length instructions. The starting position detector may be implemented as a state machine recognizing bit patterns that determine the start of an instruction. In some cases, the starting position of the one or more variable length instructions may be used to format and align the one or more variable length instructions into one or more predecoded instructions having a fixed instruction length. As such, the predecoding unit may further include a formatting and aligning circuitry, which is coupled to format the one or more variable length instructions into one or more fixed length instructions and aligning the one or more fixed length instructions into a predecoded instruction field. The one or more predecoded instructions (i.e., a formatted and aligned version of the variable length instructions) are subsequently stored in a cache memory device as a predecoded instruction field.

The predecoding unit may further be coupled to determine mapping information relating the one or more variable length instructions to the one or more predecoded instructions. In this manner, the circuit may further include a cache memory device coupled to store the mapping information and the predecoded instruction field in a first contiguous portion of the cache memory device. In some cases, the mapping information may include an adjust field containing a shift value for each of the one or more predecoded instructions. In some cases, a shift value may be a predetermined value (i.e., a value determined prior to storage in the cache) used to map the one or more variable length instructions into corresponding positions within the predecoded instruction field. As such, the predecoding unit may include an adjust field detector, which is coupled to determine the shift values for each of the one or more predecoded instructions. In some cases, the adjust field detector may be implemented as a look-up table, which may relate the starting position of each of the one or more variable length instructions to a corresponding shift value.

In some cases, the mapping information may further include a valid field containing a logic value (e.g., a logic "1" or logic high value) corresponding to an occupied position for each of the one or more predecoded instructions within the predecoded instruction field. As such, the predecoding unit may further include a valid field detector adapted to generate the valid field. In some cases, the valid field detector may be implemented using a zero detecting logic, which may assign a logic value (e.g. a logic "1") to an occupied position and an opposite logic value (e.g. a logic "0") to an unoccupied position within the predecoded instruction field.

In addition, the circuit may further include configuration circuitry coupled to fetch the first contiguous portion and a second contiguous portion from the cache memory device. The configuration circuitry may also be coupled to receive a pointer value. The pointer value may be, e.g., a program counter value, and may represent a position of one instruction from the one or more variable length instructions within a memory device. In some cases, the configuration circuitry may include a first multiplexer coupled to receive the pointer value, and in response, select one shift value from the first contiguous portion. In this manner, the one shift value may locate a predecoded instruction of the first contiguous portion, which corresponds to the one instruction of the variable length instructions.

Furthermore, the configuration circuitry may include a second multiplexer coupled to append the predecoded instructions of the first contiguous portion to a segment of the second contiguous portion into an appended instruction field. For example, the segment may include a number of predecoded instructions of the second contiguous portion substantially equal to a number of unoccupied positions (e.g., positions having a logic "0" or logic low value) in the valid field. The configuration circuitry may further include a shift register coupled to shift the appended instruction field by an amount indicated by the one shift value. In this manner, the one instruction may be shifted to a first position of the appended instruction field for subsequent processing of the one instruction by a processing unit.

A method for predecoding one or more variable length instructions prefetched from a memory device is also contemplated herein. In some cases, the method may include formatting and aligning the one or more variable length instructions into one or more predecoded instructions. In some cases, the step of formatting and aligning includes formatting the one or more variable length instructions into one or more fixed length instructions, and aligning the one or more fixed length instructions into a predecoded instruction field. As such, the predecoded instruction field contains one or more predecoded instructions (i.e. formatted and aligned instructions).

In addition, the method may include detecting a bit pattern within the one or more variable length instructions to determine a starting position for each of the one or more variable length instructions. The method may also include determining an adjust field, which may contain shift values that map the one or more variable length instructions to the one or more predecoded instructions within the predecoded instruction field. The method may further include determining a valid field, which contains logic values (e.g. a logic "1") that indicate occupied positions for each of the predecoded instructions within the predecoded instruction field. Subsequently, the method includes storing the adjust field, the valid field and the predecoded instruction field within contiguous portions of a lower level memory device (e.g., a cache memory device). By predetermining the adjust and valid fields (i.e. prior to storing the adjust and valid fields in cache) the current method advantageous eliminates the determining time needed to relate a particular prefetched instruction to a corresponding predecoded instruction during the fetch process. In this manner, the current method advantageously increases the instruction fetch time, for example, by approximately 20% over the instruction fetch time of traditional methods.

A method for decoding one or more contiguous portions of a cache memory device is further contemplated herein. In some cases, the method may include receiving a first portion and a second portion of the one or more contiguous portions from the cache memory device, where each of the one or more contiguous portions include an adjust field, a valid field, and a predecoded instruction field. In addition, the method may include selecting one or more predecoded instructions from the predecoded instruction field of the first portion. For example, the step of selecting the one or more predecoded instructions may include determining an occupied position within the predecoded instruction field by detecting one or more logic values (e.g., a logic "1" or a logic high value) within the valid field of the first portion. Likewise, the step of selecting the one or more predecoded instructions may also include determining an unoccupied position within the predecoded instruction field. As such, the step of determining an unoccupied position may include detecting one or more opposite logic values (e.g., a logic "0" or a logic low value) within the valid field of the first portion, such that one or more predecoded instructions may be selected within the second portion. In some cases, the step of selecting the one or more predecoded instructions includes appending the selected predecoded instructions of the second portion to the selected predecoded instructions of the first portion into an appended instruction field.

Furthermore, the method may include selecting, from the one or more predecoded instructions of the first portion, a next predecoded instruction to be executed by a processing unit. In some cases, the step of selecting the next predecoded instruction includes selecting a shift value from a plurality of shift values stored within the adjust field of the first portion. In one example, the shift value may be selected by a pointer value, such as a program counter value. In this manner, the step of selecting the next predecoded instruction may also include shifting the appended instruction field by an amount represented by the selected shift value to place the next predecoded instruction into a first position of the appended instruction field. Shifting the appended instruction field in such a manner may advantageously allow a quick retrieval of the next predecoded instruction. As such, the method may advantageously increase the instruction fetch time of the processing unit by, for example, approximately 20% over the instruction fetch time of traditional methods.

BRIEF DESCRIPTION OF THE DRAWINGS

Other objects and advantages of the invention will become apparent upon reading the following detailed description and upon reference to the accompanying drawings in which:

FIG. 7 is a flow chart diagram illustrating one embodiment of a method for decoding one or more contiguous portions of a cache memory device.

Figure 1:
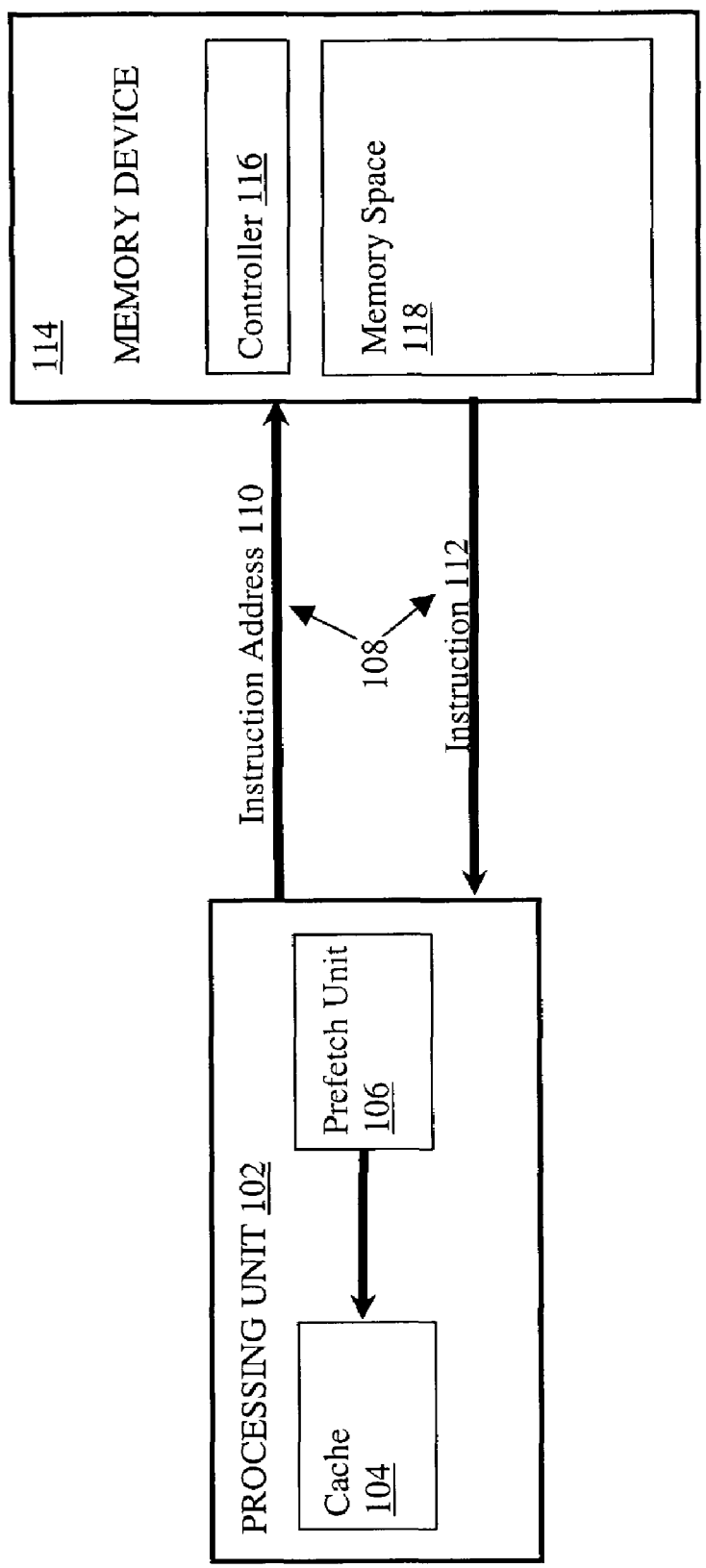
FIG. 1 is a block diagram illustrating an embodiment of a typical computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 2:
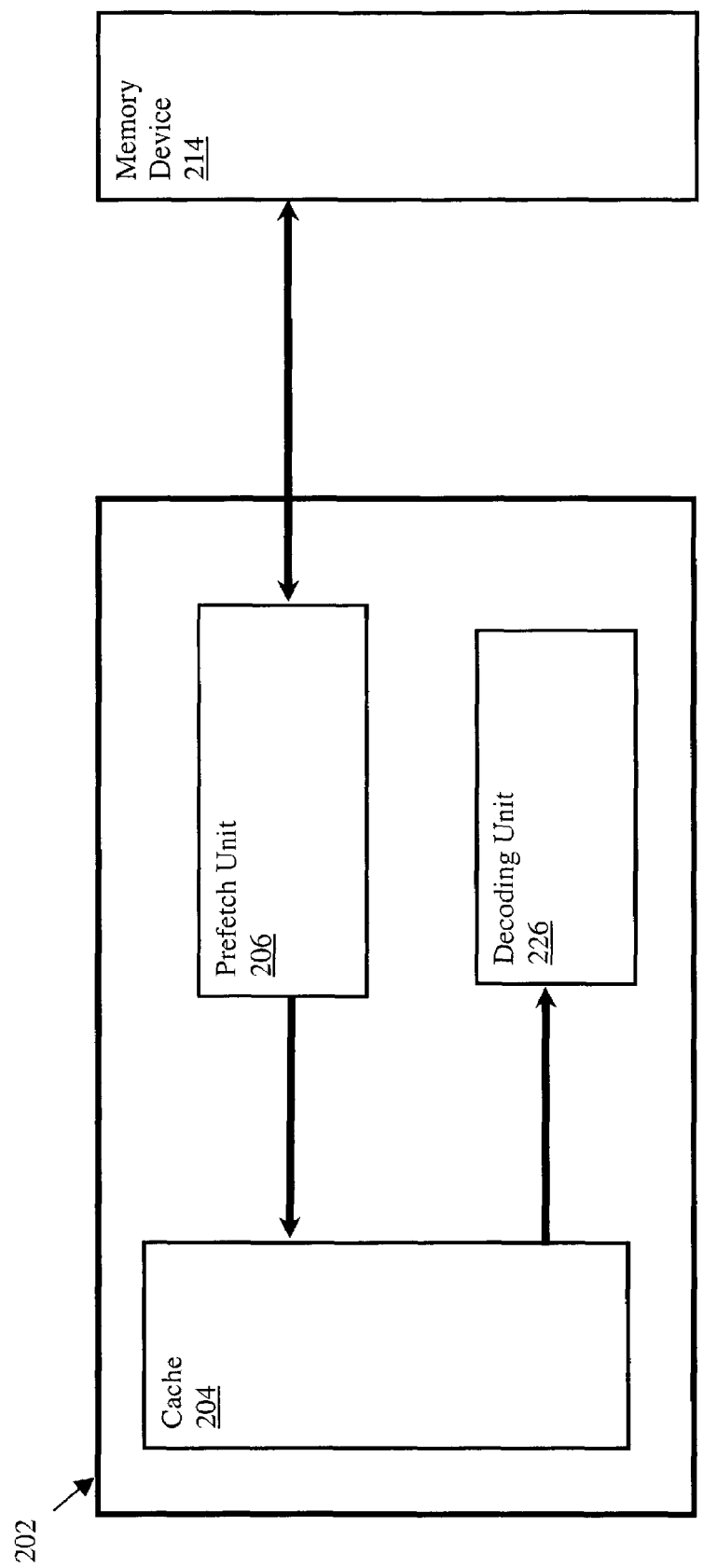
FIG. 2 is a block diagram illustrating one embodiment of a circuit for prefetching and decoding instructions.

As stated above, the concept of prefetching may involve a speculative retrieval of information. FIG. 2, for example, illustrates one embodiment of a circuit for prefetching and decoding instructions under the expectation that processing unit 202 may soon need the retrieved information. As shown in FIG. 2, prefetch unit 206 is coupled to retrieve information from a higher-level memory device, such as external memory device 214, and place the retrieved information into a lower-level memory device, such as cache memory device 204. In some cases, the information retrieved from external memory device 214 may include one or more fixed length instructions.

In other cases, however, the information retrieved from external memory device 214 may include one or more variable length instructions. In such a case, the one or more variable length instructions may be formatted into instructions having lengths predetermined and adapted for a specific processing unit. Subsequently, the formatted instructions may be stored in cache memory device 204 along with the instruction widths of corresponding variable length instructions. In this manner, after fetching the formatted instructions and instruction widths from cache memory 204, decoding unit 226 is adapted to calculate mapping information, which maps the position of the formatted instructions to the position to the one or more variable length instructions. In one example, decoding unit 226 performs such mapping using, for example, an arithmetic unit, such as a ripple carry adder.

As mentioned above, if the flow of instructions in of the pipeline is disrupted, clock cycles may be wasted and the instructions within the pipeline may be prevented from proceeding to the next processing step. As such, calculation of the mapping information after fetching instructions from the cache memory device, as described above, may disadvantageously reduce the instruction fetch time. For example, the embodiment described above uses an arithmetic unit (e.g., a ripple carry adder) to calculate the mapping information for each of the instructions fetched from the cache memory device. One problem with using such an arithmetic unit is the time in which it takes to generate a result (i.e. the mapping information). For example, a ripple carry adder typically generates a bit-wise result in which a carry bit is propagated through the ripple carry adder from the least significant bit to the most significant bit. Therefore, use of an arithmetic unit, such as a ripple carry adder, may impart a delay that is linearly proportional to the number of bits input to the arithmetic unit. Such a delay may be detrimental to the performance of processing unit 202.

In some cases, the use of a faster arithmetic unit to calculate the mapping information of instructions fetched from the cache memory device may reduce the problems described above. For example, a carry-look-ahead adder may be used. However, the use of any arithmetic unit for such purposes may still generate a significant delay substantially proportional to the size (e.g. the number of components) of the arithmetic unit. Thus, the use of any arithmetic unit to calculate the mapping information of instructions fetched from cache may hinder the processing unit's speed and performance.

Another disadvantage of the embodiment described above is when calculation of the mapping information occurs. As shown in FIG. 2, determine the mapping information may occur after fetching one or more formatted instructions from the cache memory device. In one example, processor unit 202 may request a particular instruction to be fetched for execution. Subsequently, decoding unit 226 may receive the particular instruction from cache memory device 204 and may determine the mapping information pertaining to the particular instruction before allowing processing unit 202 to execute the particular instruction. The process of calculating the mapping information after fetching the particular instruction may significantly delay the execution process. Such a delay may increase the time to fetch the particular instruction, and hence, decrease the overall performance of processing unit 202.

Figure 3:
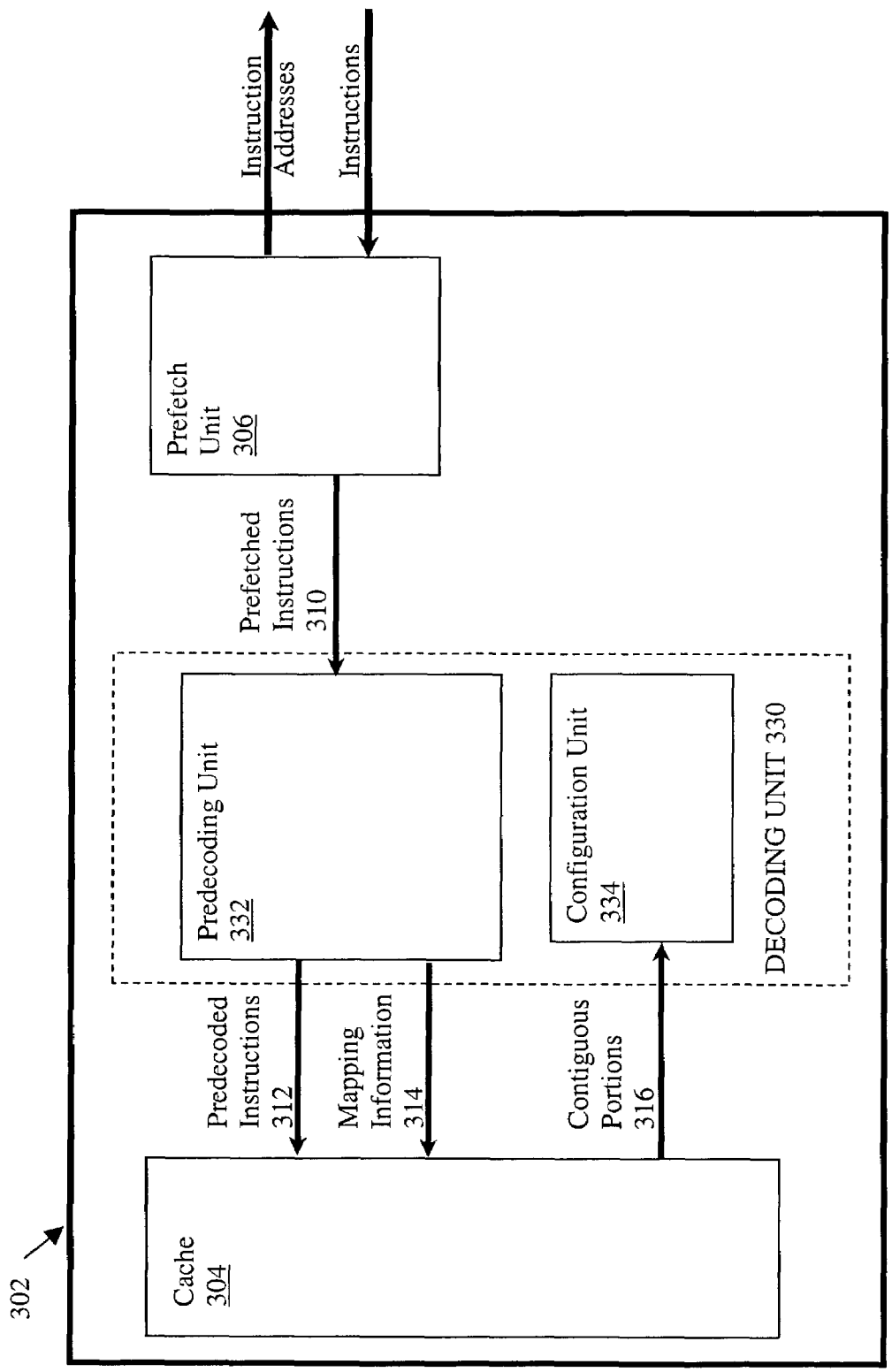
FIG. 3 is a block diagram illustrating a preferred embodiment of a circuit for prefetching and decoding instructions.

Therefore, FIG. 3 is provided herein as a preferred embodiment of a circuit for prefetching and decoding one or more variable length instructions. In particular, FIG. 3 illustrates a circuit in which the process of decoding is segmented into two or more steps performed substantially before and after the prefetched instructions are stored in cache memory device 304. As such, FIG. 3 illustrates processing unit 302 as including internal prefetch unit 306 and internal decoding unit 330. Alternatively, prefetch unit 306 and/or decoding unit 330 may be arranged external to microprocessor 302. The advantages and disadvantages of internal versus external system components are well known in the art. Thus, prefetch unit 306 and decoding unit 330 are illustrated as residing within processing unit 302 for the purpose of simplicity.

In some cases, decoding unit 330 may be segmented into predecoding unit 332 and configuration unit 334. In one embodiment, predecoding unit 332 receives one or more instructions 310 prefetched from a higher-level memory device (e.g., from main memory) via prefetch unit 306. The operation of prefetch unit 306 may be substantially identical to the operation of prefetch unit 106, as described above in reference to FIG. 1. In some cases, prefetched instructions 310 may include instructions having fixed, i.e., uniform, instruction lengths. For example, each instruction of prefetched instructions 310 may be N bits in length. However, such a case may not be practical in all applications. Therefore, prefetched instructions 310 may alternatively include instructions having variable instruction lengths, in other cases. In this manner, predecoding unit 332 is preferably adapted to receive one or more variable length instructions 310, as described in the embodiments below.

Predecoding unit 332 is adapted to partially decode (i.e., predecode) the one or more variable length instructions 310 (i.e., prefetched instructions) into one or more predecoded instructions 312. As will be described in more detail below, predecoding unit 332 is further adapted to determine mapping information 314, which relates variable length instructions 310 to predecoded instructions 312, prior to storage of predecoded instructions 312 and mapping information 314 within one or more contiguous portions of cache memory device 304. In this manner, the decoding process may be completed when one or more contiguous portions 316 are fetched from cache memory device 304 and placed into configuration unit 334. As will be described in more detail below, configuration unit 334 may complete the decoding process by utilizing mapping information 314 to select a next predecoded instruction for execution within processing unit 302.

Figure 4:
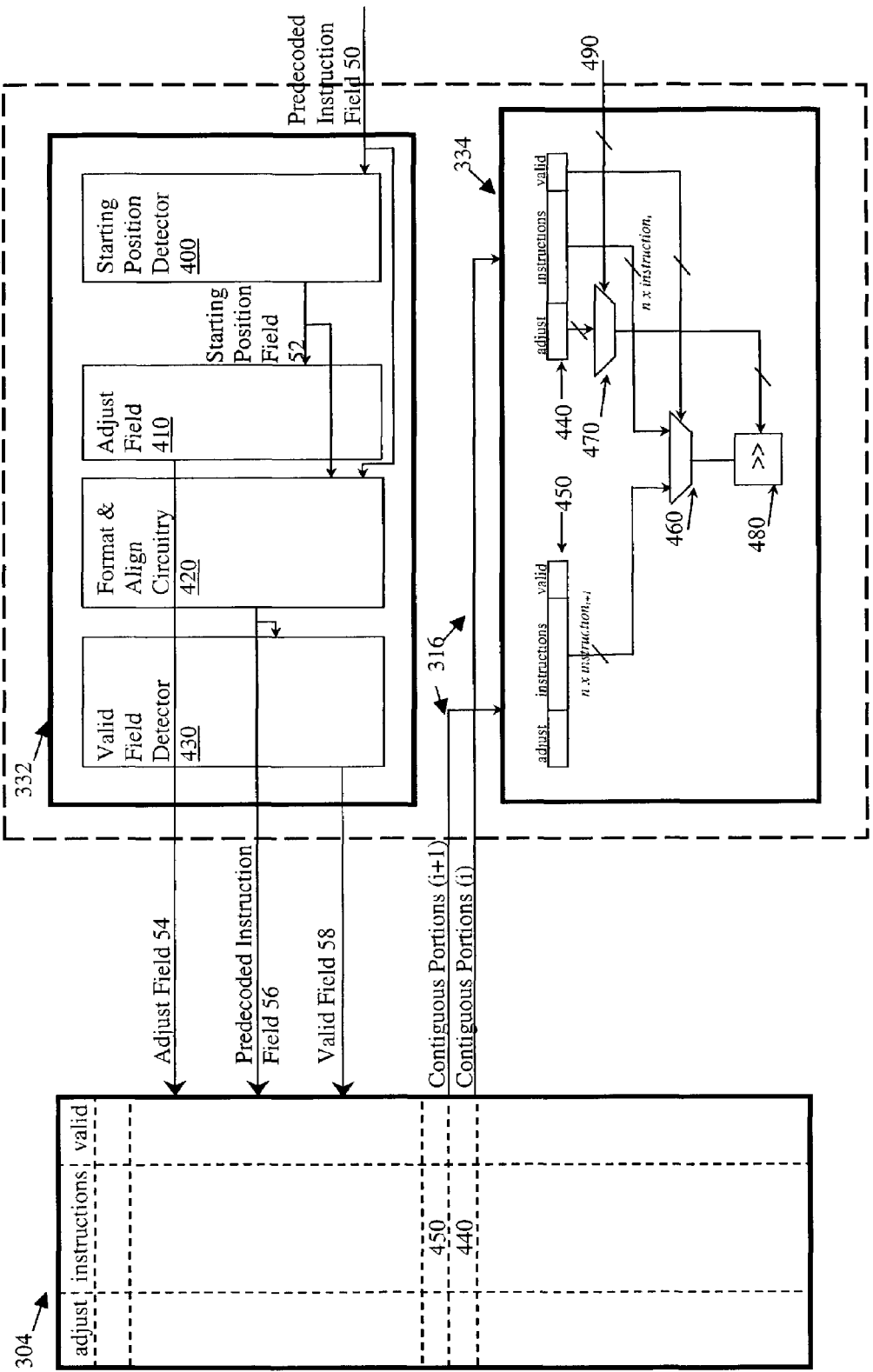
FIG. 4 is a block diagram illustrating one embodiment of a circuit for processing instructions received from a prefetch unit.
Figure 5:
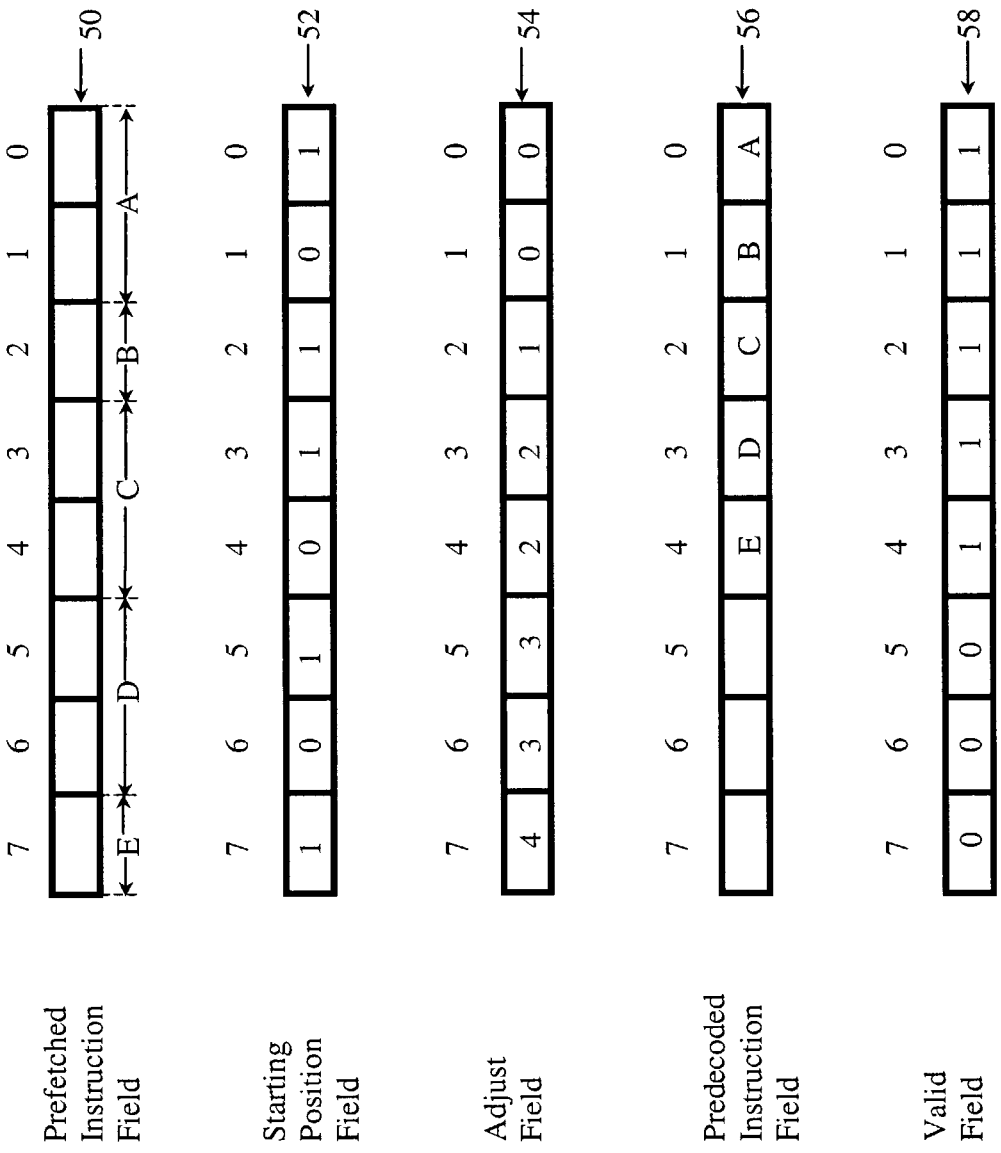
FIG. 5 a block diagram illustrating exemplary data fields represented within the circuit illustrated in FIG. 4.

The circuit described above for prefetching and decoding one or more variable length instructions, may now be discussed in greater detail with reference to FIGS. 4 and 5. In particular, FIG. 4 is a "zoomed in" view of FIG. 3 illustrating internal components of decoding unit 330 and the interaction of such components with cache memory device 304. FIG. 5 illustrates an exemplary embodiment of the information transmitted (i.e., the "interaction" mentioned above) between the internal components of decoding unit 330 and cache memory device 304, as shown in FIG. 4. In particular, FIG. 5 illustrates one example of the data fields received and generated by predecoding unit 332.

Given the sequential nature of instructions stored in memory, a block of information may be copied (e.g., in a block transfer) from a higher-level memory device to a cache memory device. Typically, the amount of information in the block is dependent on the size of the cache memory device. For example, FIG. 5 illustrates the data fields received and generated by predecoding unit 332 as each having 8 slots, where a "slot" may include a bit, a byte, a short word or a long word of information, in some cases. Alternatively, a "slot" may include any number of bits appropriate for a given application. In addition, the number of bits per slot may vary between the data fields shown in FIG. 5. In any case, the number of bits per slot may be dependent on the type of information stored in each data field. Furthermore, though the data fields of FIG. 5 are illustrated as having 8 slots, any number of slots may alternatively be included.

As described above in reference to FIG. 3, decoding unit 330 preferably includes predecoding unit 332 and configuration unit 334. Further details of predecoding unit 332 and configuration unit 334 will now be described with reference to FIG. 4. For example, FIG. 4 illustrates predecoding unit 332 as including starting position detector 400, adjust field detector 410, format and alignment circuitry 420, and valid field detector 430.

As described above in reference to FIG. 3, predecoding unit 332 is adapted to receive one or more variable length instructions 310 from prefetch unit 306. In FIGS. 4 and 5, variable length instructions 310 are included within prefetched instruction field 50. In some cases, it may be necessary to format and align the variable length instructions of prefetched instruction field 50 into a set of instructions having lengths predetermined by the needs of a specific processing unit. However, prior to formatting and aligning the variable length instructions of prefetched instruction field 50, the starting position of each variable length instruction may be determined by starting position detector 400, as shown in FIG. 4. In some cases, starting position detector 400 may utilize a state machine configured to recognize a particular bit pattern, which identifies the starting positions of the one or more variable length instructions within prefetched instruction field 50. As such, the starting position detector 400 may produce starting position field 52, which indicates the starting position, i.e., the beginning of each variable length instruction within prefetched instruction field 50.

In one example, prefetched instruction field 50 may include five variable length instructions, denoted as instructions A–E in FIG. 5. In such an example, instructions A, C and D each include two words, while instructions B and E each include one word. In addition, the starting positions of instructions A–E in prefetched instruction field 50 may be represented by a single bit value, e.g., a "1" within corresponding slots of starting position field 52. As such, a "1" in slot 0 of starting position field 52 indicates that the beginning (i.e., the first word) of instruction A is located within slot 0 of prefetched instruction field 50. Likewise, a "0" in slot 1 of starting position field 52 indicates a subsequent word of instruction A is located within slot 1 of prefetched instruction field 50. In this manner, a "1" in slots 2, 3, 5, and 7 of starting position field 52 indicates first word of instructions B, C, D, and E are located within corresponding slots of prefetched instruction field 50.

In some cases, format and alignment circuitry 420 is coupled to receive prefetched instruction field 50 and starting position field 52, as illustrated in FIG. 4. As such, format and alignment circuitry 420 may utilize starting position field 52 to format and align the one or more variable length instructions of prefetched instruction field 50 into one or more fixed length instructions. As stated above, it may be necessary to format and align the one or more variable length instructions into a set of instructions having lengths predetermined by the needs of a specific processing unit. For example, if prefetched instruction field 50 includes variable length instructions having 16-bit and 32-bit instruction lengths and the processing unit requires an 8-bit instruction length, format and alignment circuitry 420 may decode each of the variable length instructions of prefetched instruction field 50 into 8-bit length instructions. In another example, if the instruction length predetermined by the processing unit is 32-bits long and the one or more variable length instructions of prefetched instruction field 50 are 8-bits or 16-bits long, format and alignment circuitry 420 may encode the one or more variable length instructions into 32-bit length instructions. Therefore, format and alignment circuitry 420 may include an encoder or decoder that formats the variable length instructions into fixed length instructions. Note, however, that the instruction lengths discussed above are given as examples only, and may alternatively include any number of bits.

After formatting the one or more variable length instructions into one or more fixed length instructions, format and alignment circuitry 420 may also be adapted to align the one or more fixed length instructions into predecoded instruction field 56, shown in FIG. 5. In one example, format and alignment circuitry 420 is adapted to format the one or more variable length instructions in a sequential manner, such that the one or more fixed length instructions may be placed one at a time into the least significant slots of predecoded instruction field 56. Therefore, format and alignment circuitry 420 may further include a shift register for shifting the formatted instructions into predecoded instruction field 56. In any case, predecoded instruction field 56 may contain one or more of the predecoded instructions, which may be described herein as formatted and aligned versions of the one or more variable length instructions of prefetched instruction field 50.

In some cases, adjust field detector 410 may also be coupled to receive starting position field 52, as illustrated in FIG. 4. In addition, adjust field detector 410 may be adapted to produce mapping information, which "maps" the one or more variable length instructions of prefetched instruction field 50 to corresponding predecoded instructions within predecoded instruction field 56. In some cases, the mapping information produced by adjust field detector 410 may be dependant on starting position field 52. For example, adjust field detector 410 may be implemented as a look-up table, which may generate adjust field 54 in response to detecting a particular bit pattern within starting position field 52. As such, adjust field detector 410 may be implemented software in some cases.

In some cases, adjust field 54 may include a shift value for mapping each of the one or more variable length instructions of prefetched instruction field 50 to corresponding predecoded instructions within predecoded instruction field 56. In other words, adjust field 54 indicates where, in cache memory, a formatted and aligned version of an instruction fetched from memory can be found. As shown in FIG. 5, for example, prefetched instruction field 50 includes variable length instructions A (in slots 0 and 1), B (in slot 2), C (in slots 3 and 4), D (in slots 5 and 6) and E (in slot 7). In addition, predecoded instruction field 56 is shown in FIG. 5 as including predecoded (i.e., formatted and aligned) instructions A (in slot 0), B (in slot 1), C (in slot 2), D (in slot 3) and E (in slot 4). In such an example, a shift value of "0" in slots 0 and 1 of adjust field 54 indicates that a formatted and aligned version of variable length instruction A resides in slot 0 of predecoded instruction field 56. Likewise, a shift value of "1" in slot 2 of adjust field 54 indicates that a formatted and aligned version of variable length instruction B resides in slot 1 of predecoded instruction field 56. In addition, adjust field 54 maps variable length instructions C, D, and E to corresponding positions within predecoded instruction field 56 in the same manner.

As shown in FIG. 4, valid field detector 430 may be adapted to receive predecoded instruction field 56 from format and alignment circuitry 420. In some cases, the predecoded instructions may occupy only a portion of the slots within predecoded instruction field 56. As such, valid field detector 430 may be adapted to generate valid field 58 to indicate whether a particular slot of predecoded instruction field 56 is occupied or unoccupied. In some cases, valid field detector 430 may be implemented as a zero detection circuit, which would determine an occupied position by detecting a bit pattern indicating the presence of an instruction within a slot of predecoded instruction field 56. Likewise, a zero detection circuit may determine an unoccupied position by the absence of a bit pattern within a slot of predecoded instruction field 56.

In any case, valid field 58, as illustrated in FIG. 5, may be used to indicate where the one or more predecoded instructions are positioned within predecoded instruction field 56. In one example, a "1" may be included within one or more slots of valid field 58 to indicate an occupied position within corresponding slots of predecoded instruction field 56. In the same manner, a "0" may be included within one or more slots of valid field 58 to indicate an unoccupied position within corresponding slots of predecoded instruction field 56. Alternatively, occupied and unoccupied positions of predecoded instruction field 56 may be indicated with 0's and 1's, respectively, in valid field 58.

After predecoding and generating mapping information, as described above, predecoding unit 332 may be adapted to store adjust field 54, predecoded instruction field 56, and valid field 58 within a first contiguous portion of cache memory device 304. In some cases, a contiguous portion may be described as substantially one row of memory space within cache memory device 304, as shown in FIG. 4. Alternatively, a contiguous portion may include more than one consecutive rows of memory space within cache memory device 304. In any case, pre-determining mapping information prior to cache storage advantageously an instruction needed for execution to be fetched using the mapping information and presented to the processor for processing. In this manner, predetermination of mapping information may increase instruction fetch time by as much as 20%, in some cases, over traditional methods, which determine mapping information after fetching an instruction from cache.

As described in FIG. 3, the decoding unit 330 may also include configuration unit 334, in which utilizing mapping information 314 to select a next predecoded instruction for execution within processing unit 302 may complete the decoding process. To select a next predecoded instruction, configuration unit 334 is first adapted to fetch one or more contiguous portion 316 from cache memory device 304 as described above. Further details of configuration unit 334 will now be described with reference to FIG. 4 and FIG. 5.

For example, FIG. 4 illustrates configuration unit 334 as adapted to receive first contiguous portion 440 and second contiguous portion 450, each of which comprise an adjust field, a predecoded instruction field, and a valid field. In addition, FIG. 4 illustrates configuration unit as including first multiplexer 460, a second multiplexer 470 and a shifting register 480. In this manner, first multiplexer 460 is adapted to receive the predecoded instruction field and valid field from first contiguous portion 440. The valid field, as mentioned above, indicates which positions, or slots, within the predecoded instruction field contain a predecoded instruction. As stated above, an instruction stream must contain a maximum amount of predecoded instructions to maintain a full pipeline. As such, the first multiplexer 460 may be adapted to select, from the first contiguous portion, a number of predecoded instructions substantially equal to the number of occupied positions within the valid field. In addition, the first multiplexer may be further adapted to select, from the second contiguous portion, a number of predecoded instructions substantially equal to the number of unoccupied positions within the valid field.

As shown in FIG. 5, for example, predecoded instruction field 56 includes predecoded instructions A (in slot 0), B (in slot 1), C (in slot 2), D (in slot 3) and E (in slot 4). In addition, valid field 58 is shown in FIG. 5 as including a "1" in slots, corresponding to the occupied positions in predecoded instruction field 56. Likewise, a "0" in slots, represents an unoccupied position within corresponding slots of predecoded instruction field. In such an example, the first multiplexer 460 is adapted to select five predecoded instructions (e.g. instructions A, B, C, D, E) from predecoded instruction field equaling five of the first contiguous portion 440. First multiplexer 460 is further adapted to select three predecoded instructions from the predecoded instruction field of second contiguous portion's 450.

As mentioned above, a pipeline must remain full in order to operate efficiently. If the flow of instructions in the pipeline is disrupted, clock cycles may be wasted and the instructions within the pipeline may be prevented from proceeding to the next processing step. To ensure a constant flow of predecoded instructions through the pipeline, first multiplexer 460 may be further adapted to concatenate the selected predecoded instructions from second contiguous portion 450 to the selected predecoded instructions from first contiguous portion 440. For example, first multiplexer 460 may be adapted to concatenate, or append, the selected predecoded instructions from second contiguous portion 450 to a last instruction (e.g., instruction E) of the selected predecoded instructions from first contiguous portion 440 into an appended instruction field.

Concurrently, the processing unit may indicate a next instruction needed for execution by updating pointer value 490 to indicate the position of the next instruction as stored within an external memory device. Pointer value 490 may be, e.g., a program counter value sent to configuration unit 334. However, since the prefetched instructions have been formatted and aligned prior to storage within cache memory 304, the position of the next instruction within cache memory 304 must be determined. To determine the cache memory position of the next instruction, pointer value 490 may be used to select an appropriate shift value from the plurality of shift values within the adjust field of first contiguous portion 440. As shown in FIG. 4, second multiplexer 470 may be adapted to select a shift value corresponding to the next instruction. After selection of the shift value, shift register 480 is adapted to shift the instructions within the appended instruction field by an amount indicated by the shift value. As such, shift register 480 is adapted to place the next instruction within a first position of the appended instruction field in readiness for subsequent processing of the next instruction. In some cases, such a shifting process may truncate a number of instructions preceding the next instruction to place the next instruction within the first position of the appended instruction field.

In one example, pointer value 490, which indicates the next instruction needed for execution, may be substantially equal to 5. As shown in FIG. 5, prefetched instruction D is located in slot 5 of prefetched instruction field 50. As such, a pointer value of 5 may also be used to select slot 5 of adjust field 54 to thereby select the shift value corresponding to a predecoded version of instruction D. As shown in FIG. 5, the shift value stored within slot 5 of adjust field 54 (i.e., a shift value of 3) indicates predecoded instruction D is stored within slot 3 of predecoded instruction field 56. Therefore, pointer value 490 selects a shift value from adjust field 54, which may be used by shift register 480 to place the next instruction within a first position of the appended instruction field. As stated above, shift register 480 may truncate a number of instructions preceding the next instruction. As an example, predecoded instructions A–C may be truncated to place predecoded instruction D within the first position.

Therefore, the circuit described herein advantageously determines the mapping information prior to storage of the mapping information and predecoded instruction field in cache memory device 304. As stated above, such a circuit advantageously improves the instruction fetch time significantly over circuits, which calculate mapping information after fetching instructions from cache. In some cases, the circuit described herein uses a look-up table for determining such mapping information. Use of such a look-up table advantageously reduces the time needed to produce the mapping information, as compared to use of any arithmetic unit. By predetermining mapping information prior to storage of the mapping information within the cache memory device, the present circuit ensures faster retrieval of the predecoded instructions from cache. For example, predetermination of mapping information prior to cache storage may improve the instruction fetch time by as much as 20%, in some cases. In addition, the present circuit advantageously provides maximum instruction flow rate through the pipeline by concatenating the selected predecoded instructions from the first and second contiguous portions.

Figure 6:
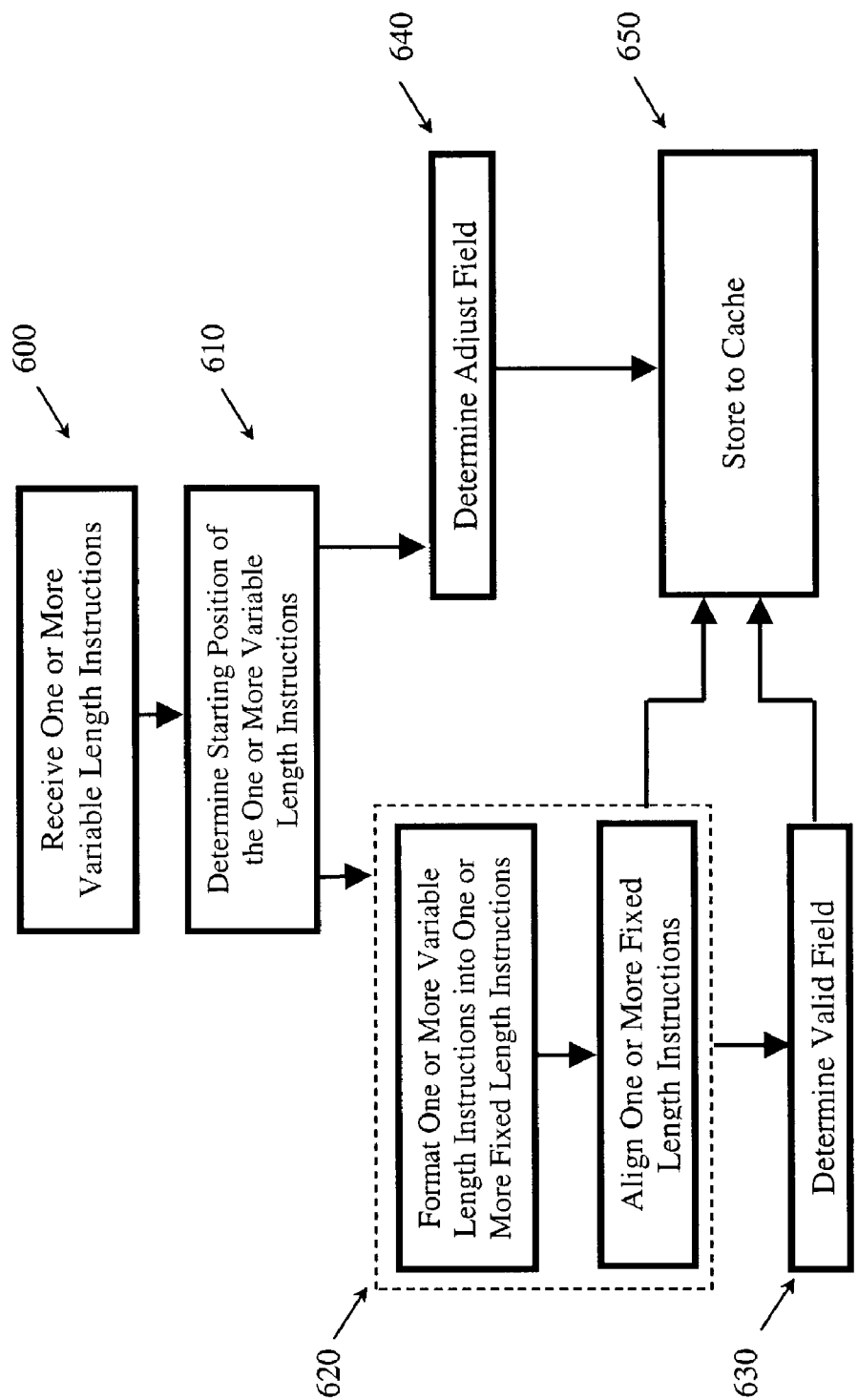
FIG. 6 is a flow chart diagram illustrating one embodiment of a method for predecoding one or more variable length instructions prefetched from a memory device.

Furthermore, FIG. 6 illustrates one embodiment of a method for predecoding one or more variable length instructions prefetched from a memory device. Predecoding unit 332, as described above in FIG. 4, may receive the one or more variable length instructions via a prefetch unit (step 600), as shown in FIG. 6. As such, the method may include determining a starting position (step 610) of the one or more variable length (i.e., prefetched) instructions, in some cases. For example, the starting position may be detecting a bit pattern. In some cases, the step of detecting a bit pattern may use, for example, a state machine to determine the starting position. The method may further include formatting and aligning (step 620) the one or more variable length instructions into one or more predecoded instructions. For example, the step of formatting and aligning may include formatting the one or more variable length instructions into one or more fixed length instructions, which are predetermined by the processor and aligned sequentially into predecoded instruction field 56, as shown in FIG. 5. The method may also include determining a valid field (step 630), in which an occupied position of the one or more fixed length instructions is indicated by a logic value of "1."

As such, the method may also include determining an adjust field (step 640) including shift values for mapping the one or more variable length instructions to the predecoded instructions within a predecoded instruction field. In some cases, the adjust field may be determined using the starting positions of the one or more variable length instructions. For example, the step of determining the adjust field (step 640) may include using a pre-generated look-up table to select the adjust field corresponding to the starting position for each of the one or more variable length instructions. Subsequently, the method may also include storing the valid field, the predecoded instruction field and the adjust field within contiguous portions of a cache memory device (step 650).

FIG. 7 is a flow chart diagram of an embodiment of a method for decoding one or more contiguous portions fetched from a cache memory device. In some cases, the method may include receiving a first portion and a second portion of the one or more contiguous portions fetched from the cache memory device (step 700). In some cases, the first and second portions may each include a valid field, a predecoded instruction field and an adjust field. The method may also include selecting one or more predecoded instructions from the first portion (step 710). In some cases, the one or more predecoded instructions of the first portion may be selected using the occupied positions indicated within the valid field of the first portion. Next, the method may include selecting one or more predecoded instructions from the second portion (step 720). For example, the one or more predecoded instructions of the second portion may be selected using the unoccupied positions indicated within the valid field of the first portion. In this manner, the method may include appending the one or more selected instructions of the second portion to the one or more selected instructions of the first portion into an appended instruction field (step 730).

In some cases, the method may include selecting a next instruction to be executed by a processing unit. As such, the method may selecting a shift value from a plurality of shift values within the adjust field of the first portion (step 740). For example, the step of selecting a shift value may include receiving a pointer value from the processing unit that indicates next instruction needed for execution. In such an example, the pointer value may select the shift value corresponding to the next instruction needed for execution. Subsequently, the method may include shifting the appended instruction field by the selected shift value (step 750).

It will be appreciated to those skilled in the art having the benefit of this disclosure that the circuit and method described herein are believed to provide an improved method for determining mapping information relating predecoded instructions stored in a lower-level memory device to prefetched instructions stored in a higher-level memory device. Such a circuit and method advantageously provides an increased instruction fetch time, thus improving processor performance. Further modifications and alternative embodiments of various aspects of the invention will be apparent to those skilled in the art in view of this description. For example, the lookup table may be generated by offline (i.e. script) and stored in hardware, e.g., Read-Only-Memory. Therefore, it is intended that the following claims be interpreted to embrace all such modifications and changes and, accordingly, the specification and drawings are to be regarded in an illustrative rather than a restrictive sense.

What is claimed is:

1. A circuit adapted to receive one or more variable length instructions from a memory device via a prefetch unit, the circuit comprising:
   a predecoding unit coupled to align and format the one or more variable length instructions into one or more predecoded instructions, wherein the predecoding unit is configured to determine mapping information relating the one or more variable length instructions to the one or more predecoded instructions;
   wherein the mapping information comprises;
      an adjust field comprising a shift value for each of the one or more variable length instructions;
      a valid field comprising a logic value indicating an occupied position for each of the one or more predecoding instructions within a predecoded instruction field; and
   a cache memory device coupled to store the mapping information and the predecoded instruction field, comprising the one or more predecoded instructions in a first contiguous portion of the cache memory device.

2. The circuit recited in claim 1, wherein the predecoding unit comprises an adjust field detector coupled to determine the shift values, wherein the shift values map the one or more variable length instructions to corresponding positions in the predecoded instruction field.

3. The circuit recited in claim 2, wherein the adjust field detector comprises a look-up table relating a starting position for each of the one or more variable length instructions to a corresponding shift value.

4. The circuit recited in claim 3, wherein the predecoding unit further comprises alignment circuitry coupled to format and align the one or more variable length instructions using the starting positions.

5. The circuit recited in claim 1, wherein the circuit further comprises configuration circuitry coupled to receive the first contiguous position, a second contiguous portion, and a pointer value representing one instruction of the one or more variable length instructions.

6. The circuit recited in claim 5, wherein the configuration circuitry comprises:
   a first multiplexer coupled to select one shift value from the first contiguous portion, wherein the one shift value locates a predecoded instruction stored within the first contiguous portion that corresponds to the one instruction;
   a second multiplexer coupled to append the predecoded instructions to a segment of the second contiguous portion into an appended instruction field, wherein the segment comprises a number of predecoded instructions equal to a number of unoccupied positions in the valid field; and
   a shift register coupled to shift the appended instruction field by the one shift value.

7. A method for predecoding one or more variable length instructions prefetched from a memory device, the method comprising:
   formatting and aligning the one or more variable length instructions into one or more predecoded instructions arranged within a predecoded instruction field;
   determining an adjust field comprising shift values for mapping the one or more variable length instructions to corresponding predecoded instructions within the predecoded instruction field;

determining a valid field comprising a logic value indicating an occupied position for each of the one or more predecoded instructions in the predecoded instruction field; and storing the adjust field, the predecoded instruction field and the valid field within contiguous portions of a cache memory device.

8. The method as recited in claim 7, further comprising detecting a bit pattern within the one or more variable length instructions to determine a starting position for each of the one or more variable length instruction.

9. The method as recited in claim 8, wherein the step of detecting a bit pattern comprises using a state machine to determine the starting position.

10. The method as recited in claim 8, wherein the step of determining the adjust field comprises using a lookup table to select the adjust field corresponding to the starting positions for each of the one or more variable length instructions.

11. The method as recited in claim 7, wherein the step of formatting and aligning comprises formatting the one or more variable instructions into one or more fixed length instructions and aligning the one or more fixed length instructions into the predecoded instruction field.

12. A method for decoding one or more contiguous portions of a cache memory device, the method comprising:
receiving a first portion and a second portion of the one or more contiguous portions from the cache memory device, wherein the one or more contiguous portions each comprise a valid field, an adjust field, and a predecoded instruction field;
selecting one or more predecoded instructions from the predecoded instruction field of the first portion; and
selecting a next predecoded instruction to be executed by a processing unit from the one or more predecoded instructions of the first portion.

13. The method as recited in claim 12, wherein the step of selecting one or more predecoded instructions comprises determining an occupied position within the predecoded instruction field by detecting one or more logic values within the valid field of the first portion.

14. The method as recited in claim 13, wherein the step of selecting one or more predecoded instructions further comprises detecting one or more opposite logic values within the valid field of the first portion to select one or more predecoded instructions in the second portion.

15. The method as recited in claim 14, wherein the step of selecting one or more predecoded instructions further comprises appending the selected predecoded instructions of the second portion to the selected predecoded instructions of the first portion into an appended instruction field.

16. The method as recited in claim 12, wherein the step of selecting the next predecoded instruction comprises selecting a shift value from a plurality of shift values within the adjust field of the first portion.

17. The method as recited in claim 15, wherein the step of selecting a shift value comprises inputting a pointer value into a multiplexer configured to receive the plurality of shift values.

18. The method as recited in claim 17, wherein the pointer value comprises a program counter value.

19. The method as recited in claim 15, wherein the step of selecting the next predecoded instruction further comprises shifting the appended instruction field by the selected shift value to place the next predecoded instruction into a first position of the appended instruction field.

* * * * *